United States Patent [19]

Jones

[11] 3,737,121
[45] June 5, 1973

[54] DUAL-FUSELAGE AIRCRAFT HAVING YAWABLE WING AND HORIZONTAL STABILIZER

[75] Inventor: Robert T. Jones, Los Altos Hills, Calif.

[73] Assignee: The United States of America as represented by the Administrator of the National Aeronautics and Space Administration, Washington, D.C.

[22] Filed: Dec. 9, 1971

[21] Appl. No.: 206,279

[52] U.S. Cl. .......................... 244/13, 244/46, 244/55
[51] Int. Cl. ............................. B64c 1/02, B64c 3/38
[58] Field of Search ................. 244/13, 1 R, 12 R, 244/34 R, 35 R, 39, 40 R, 42 R, 42 A, 45 R, 46, 47, 48; 46/74 R, 76 R

[56] References Cited

UNITED STATES PATENTS

| | | | |
|---|---|---|---|
| 1,710,028 | 4/1929 | Morse | 244/45 R |
| 2,140,783 | 12/1938 | Bellanca | 244/13 |
| 2,160,089 | 5/1939 | Schairer | 244/48 |
| 3,381,918 | 5/1968 | Jacquart et al. | 244/46 |

Primary Examiner—Milton Buchler
Assistant Examiner—Barry L. Kelmachter
Attorney—Darrell G. Brekke, Armand G. Morin, Sr. and John R. Manning

[57] ABSTRACT

An aircraft including a pair of fuselages disposed in parallel and coupled together by a main wing and a horizontal stabilizer which are pivotally attached to the fuselages. The pivotal attachment allows the airfoils to be yawed relative to the fuselages for high speed flight while at the same time spreading the weight and volume distribution of the aircraft along the direction of flight. The main wing is upwardly curved at the ends to compensate for any roll tendency caused by its yawed positioning.

16 Claims, 19 Drawing Figures

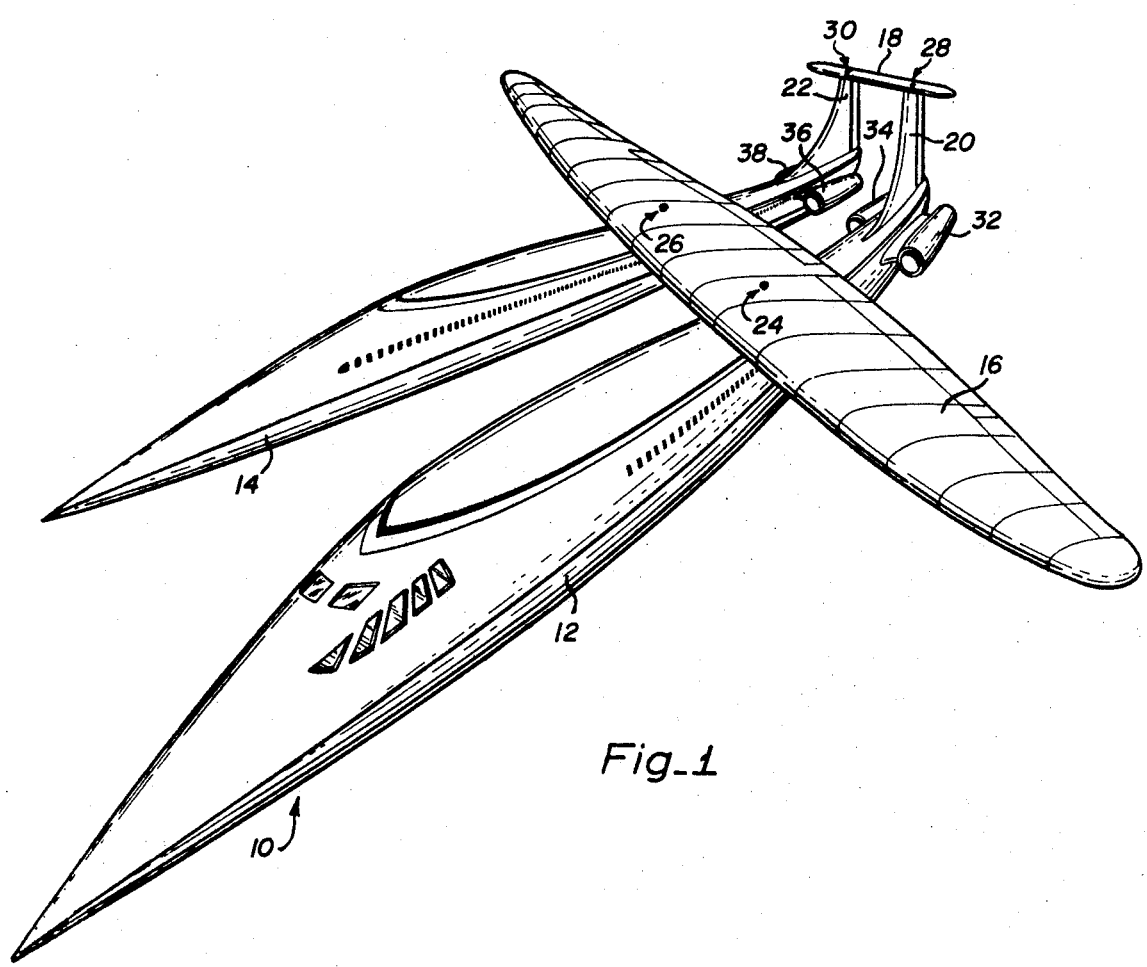
Fig_1
INVENTOR
ROBERT T. JONES

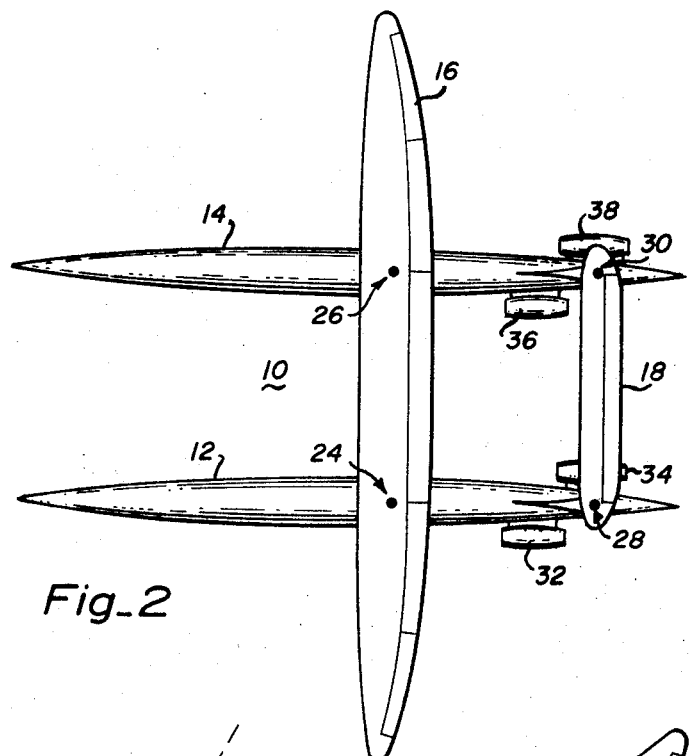
Fig_2
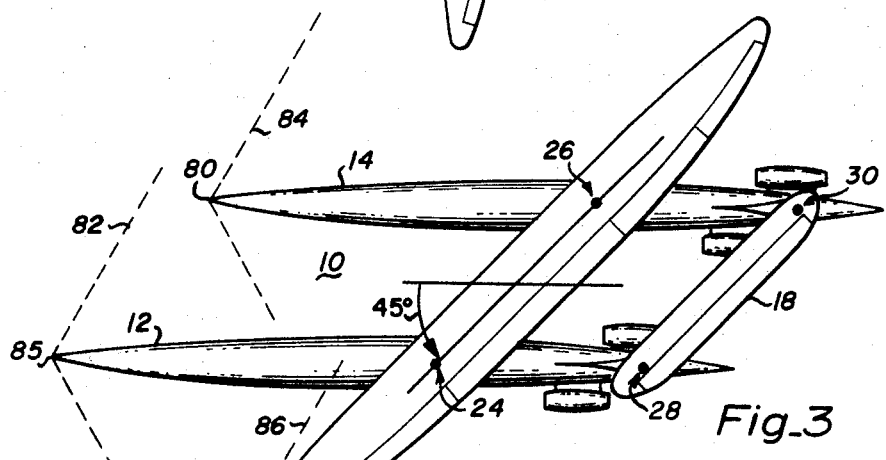
Fig_3
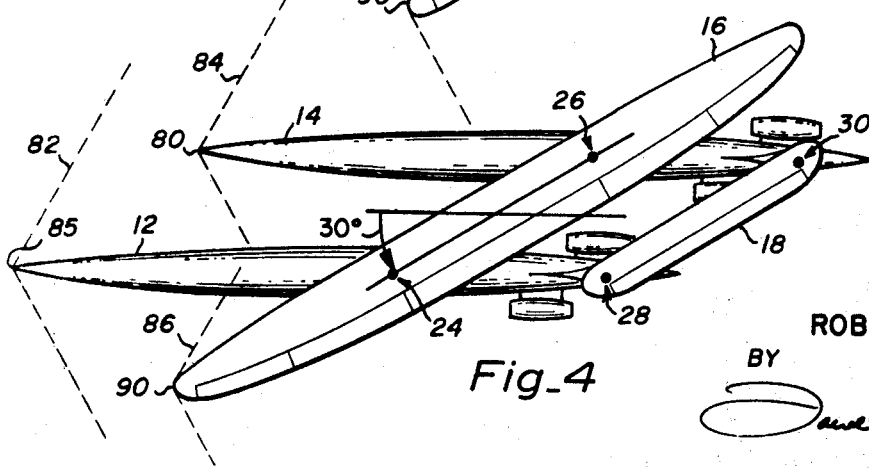
Fig_4
INVENTOR
ROBERT T. JONES

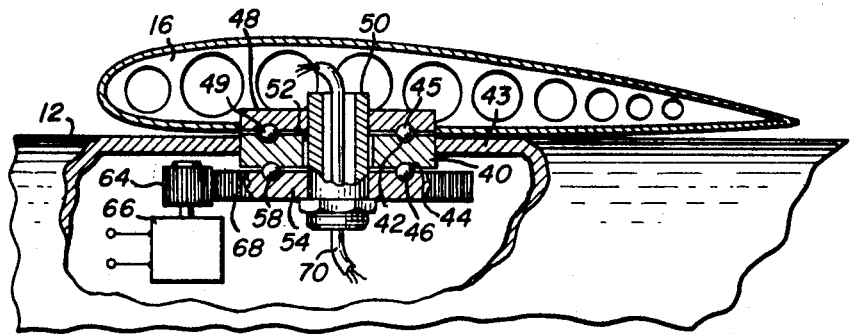
*Fig. 5*
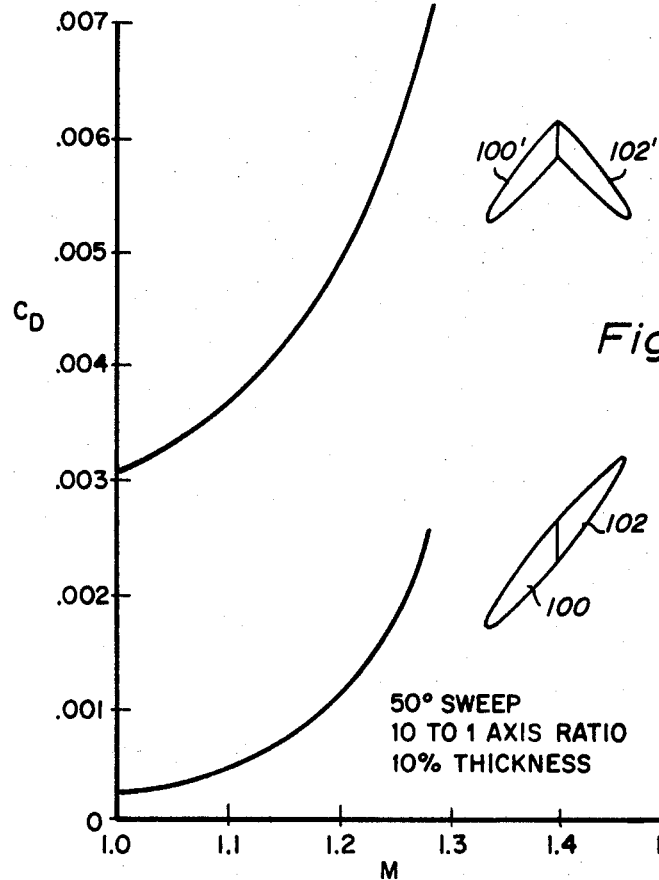
*Fig. 6*
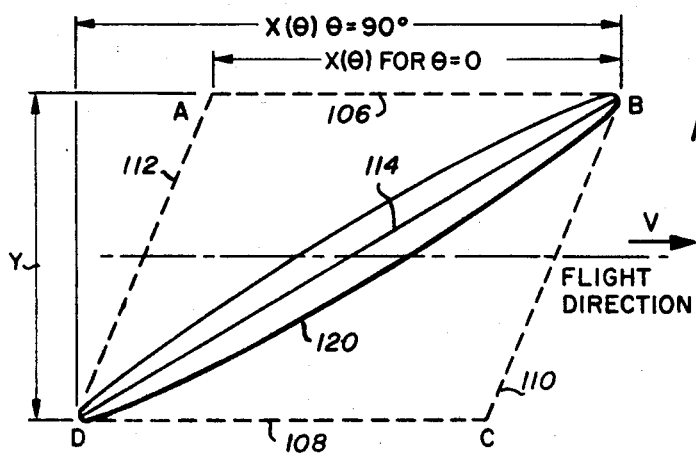
*Fig. 7*
INVENTOR
ROBERT T. JONES
BY
ATTORNEY

INVENTOR
ROBERT T. JONES $$C_{L_n} = \frac{C_L}{\sin^2 \psi}$$

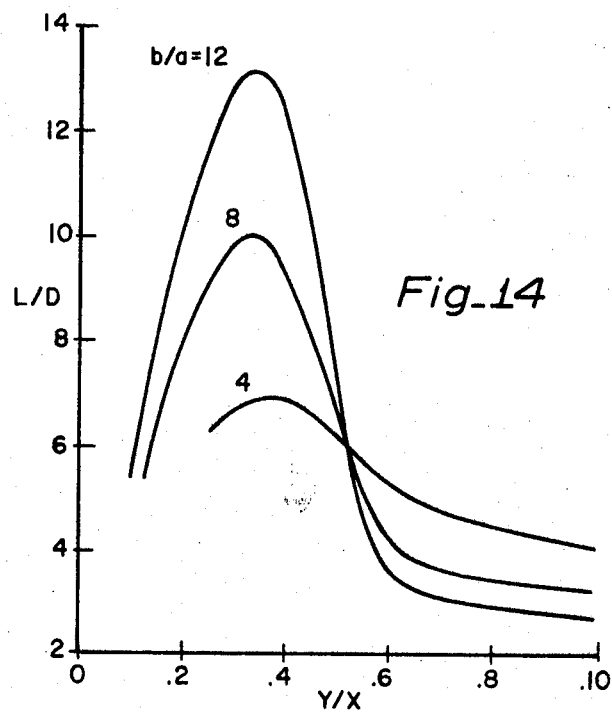
*Fig_14*
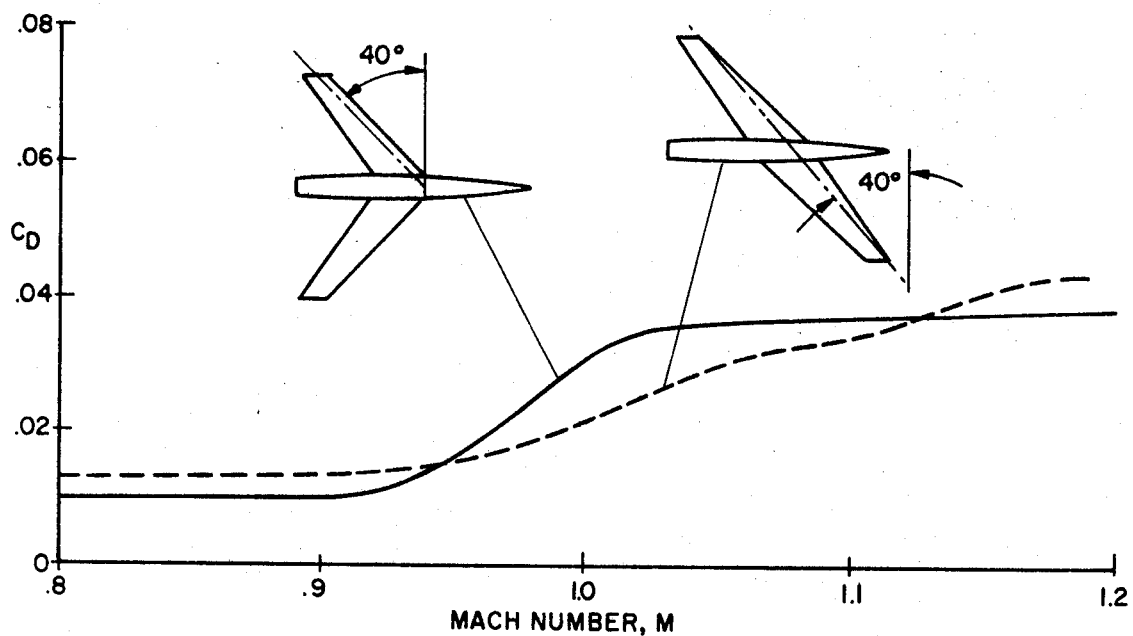
*Fig_15*

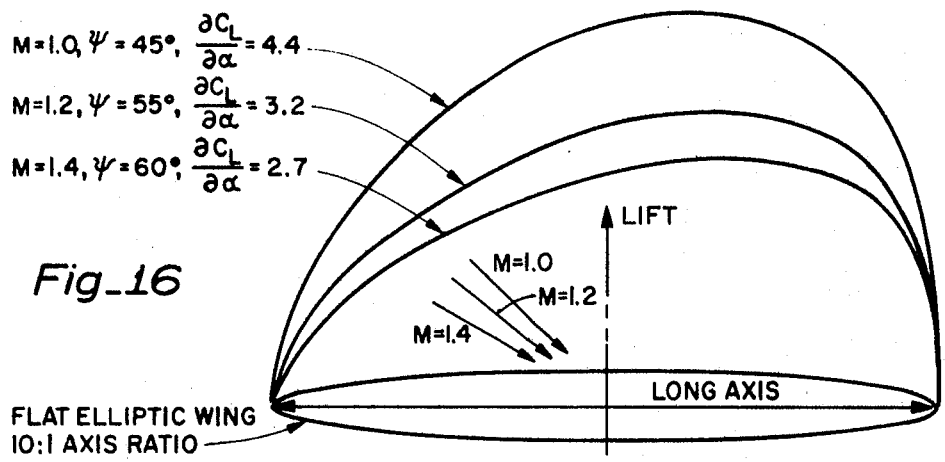
*Fig_16*
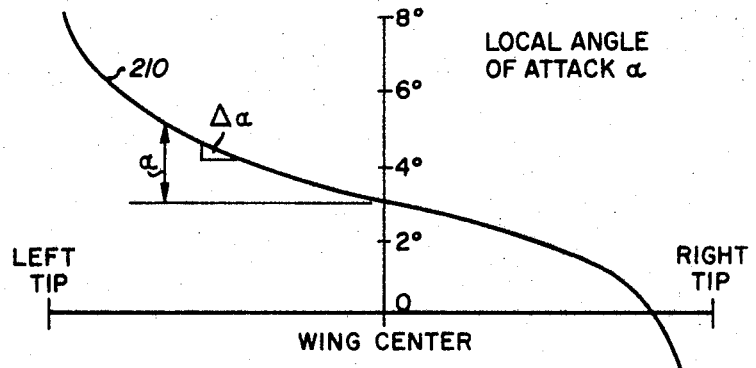
*Fig_17*
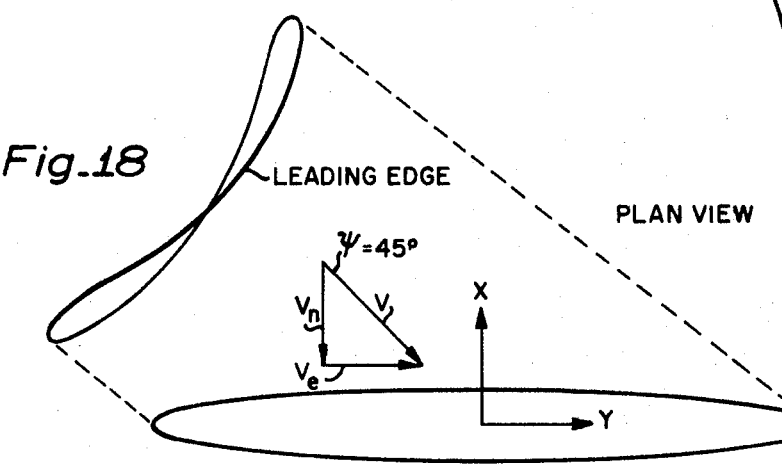
*Fig_18*
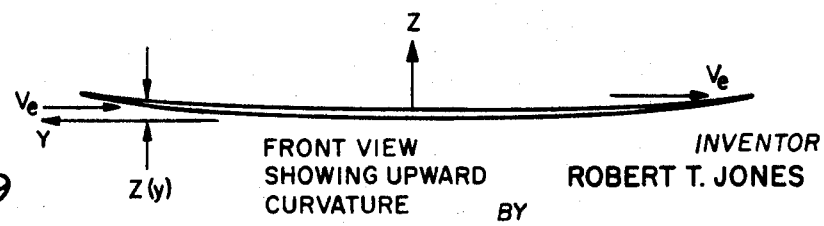
*Fig_19*

DUAL-FUSELAGE AIRCRAFT HAVING YAWABLE WING AND HORIZONTAL STABILIZER

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates to improvements in winged aircraft and more particularly to an aircraft in which the relative disposition of wing to fuselage can be changed (yawed) in flight to optimize the aircrafts capability of flying at both transonic and supersonic speeds.

2. Discussion of the Prior Art

It is well known that the airframe configuration requirements for efficient supersonic flight are not compatible with the aircraft configuration requirements for efficient slow speed flight, take-off and climb, or descent and landing. For low speed flight, and conventional take-off and landing, the optimum wing planform is generally considered to be a long span, narrow chord wing having little, if any, sweep angle.

Since the total lift developed by a lifting airfoil, other factors such as angle of attack and dynamic pressures being equal, is substantially dependent on the aspect ratio of the airfoil, defined as the square of the span of the airfoil divided by the surface area thereof, it is apparent that a long narrow wing is capable of developing substantially greater lift than is attainable using a short broad wing of the same plan area. The use of the high aspect ratio wing offers the advantages that the angle of attack required for landing and take-off is at the low end of the spectrum. Since a high angle of attack is not required, the take-off and landing speeds are lower than for low aspect ratio wings, thus permitting relatively short take-off and landing, as well as low speed climb to altitude. Furthermore, the drag due to lift is also at the low end of the spectrum, thereby providing high aerodynamic efficiency for subsonic cruise.

For transonic and supersonic flight however, highly swept wings are considered preferable since aerodynamic drag may be greatly reduced thereby, as well as other advantages being obtained. For example, even during high altitude subsonic cruise the highly swept wing configuration develops a comparatively low drag coefficient, while still developing the required lift coefficient. It has been experimentally shown that lift/drag ratios of 10 to 12 may be obtained with the highly swept wing at supersonic high altitude cruise thus making such flights economically feasible even in the case of commercial transport aircraft. The highly swept wing configuration is also preferred for supersonic flight at low levels, where the combination of high dynamic pressure at the high frequency end of the gust spectrum may establish the structural strength requirements of the aircraft, since the gust loads imposed on a highly swept wing are much smaller than on a more or less straight wind due to a smaller change in lift force resulting from change in the angle of attack. This result is due to the fact that a moving aircraft experiences atmospheric turbulence only as the result of sudden changes in the angle of attack which may be said to be in the direction of the resultant of the vertical component of gust velocity and horizontal component of aircraft velocity.

However, a swept wing aircraft designed solely on the basis of supersonic high performance flight will obviously not perform satisfactorily for subsonic cruise, take-off and landing. Even present day supersonic aircraft are designed with aspect ratios higher than that considered optimum for supersonic cruising flight in order to make take-off and landing feasible. These supersonic aircraft must also climb to cruise altitude at subsonic speeds to prevent heavy shock wave ground damage at the expense of increased fuel consumption since the relatively low aspect ratio of the wing results in increased drag due to lift while in the climb. For example, it is not unusual for a supersonic swept wing transport on a trans-Atlantic flight to expend 30 percent or more of its total fuel requirement during take-off and climb to cruise altitude at subsonic speed.

Various attempts have been made to enable the wing configuration of an aircraft to be modified in flight so as to optimize both the low speed and high speed performance of the aircraft. Examples of these so-called variable geometry aircraft, in which the sweep back is modified by moving the wings relative to the fuselage in simple or compound motions, are disclosed in the U.S. Pat. to Alfred Jr. et al., No. 3,053,484; Halliwell, 3,133,716; Jacquart et al., 3,381,918; Willox, No. 3,405,280; Jacquart et al., No. 3,405,891; and Whitener et al., No. 3,447,761. Such examples include devices which swivel each wing about pivots so as to effect a transition from sharp sweep back suited for high speeds, to smaller sweep back for obtaining the necessary lift at low speeds.

These solutions, however, have the inherent disadvantages that the swiveling of the wings results in a shift in the center of pressure of the aerodynamic forces exerted thereon as well as in a displacement of the center of gravity of the aircraft. Furthermore, the position of the center of lift is effected by the flight speed with the transition from subsonic to supersonic speed notably resulting in a large rearward shift of the center of pressure of the force exerted on the wing. In addition, the structural components necessary to accomodate a wing pivoted at a point near one of its ends requires the use of massive bearings which must carry the wing root bending moment.

SUMMARY OF THE PRESENT INVENTION

Briefly, the present invention includes an airframe in which a parallelogram principle is utilized to achieve an efficient selective angular disposition between a pair of airfoils (a main wing and a horizontal stabilizer) and a pair of fuselages. The main wing and the horizontal stabilizer form one set of parallel sides of the parallelogram while the two fuselages form the other two sides. The two airfoils are pivoted to the spaced fuselages and enable two important in-flight changes in aircraft configuration to be effected: The first is the skewing or yawing of the airfoils relative to the direction of flight for high speed flight; the second is the lateral spreading of the weight distribution to minimize the bending stresses of the wing. The increased extension of the aircraft components in the fore and aft direction serves further to reduce the drag at supersonic speed. Another feature of the present invention is the upwardly curved main wing configuration which compensates for any roll tendency caused by the yawed positioning of the wing.

An important advantage of the present invention is that since the wings are pivotally attached to each of the two fuselages, a two point suspension is permitted which adds structural integrity to the airframe configuration.

Another advantage of the present invention is that a single wing planform is used to provide optimum flight characteristics for both subsonic speed and supersonic speed operation.

Other advantages of the present invention will no doubt become apparent to those of ordinary skill in the art after having read the following detailed description of a preferred embodiment which is illustrated in the several figures of the drawings.

IN THE DRAWINGS

FIG. 1 is a perspective view showing a dual fuselage yawable wing aircraft in accordance with the present invention.

FIGS. 2-4 are top views showing the aircraft embodiment of FIG. 1 in various flight configurations.

FIG. 5 is a partial cross section schematically illustrating in simplified form one way in which the airfoils of the illustrated embodiment may be pivotally attached to the fuselage.

FIG. 6 is a diagram illustrating the calculated wave drag of symmetric and anti-symmetric wings.

FIG. 7 is a diagram illustrating the optimum distribution of lift and volume within an area A–B–C–D.

FIG. 14 is a diagram illustrating the estimated L/D ratio for $M = 2.0$.

FIG. 15 is a diagram illustrating the drag at zero lift for yawed and swept wings.

FIG. 16 is a diagram illustrating the lift distribution for a flat elliptic wing having a 10:1 axis ratio.

FIG. 17 shows a plan view of an upwardly curved elliptic wing, and an angular front view of the same wing showing the change in effective angle of attack developed in accordance with the present invention.

FIG. 18 is a front view of the wing shown in FIG. 16.

FIG. 19 is a diagram illustrating the local angle of attack of the wing shown in FIGS. 16 and 17 when in a Mach 1 configuration.

DETAILED DESCRIPTION OF A PREFERRED EMBODIMENT

Figure 8:
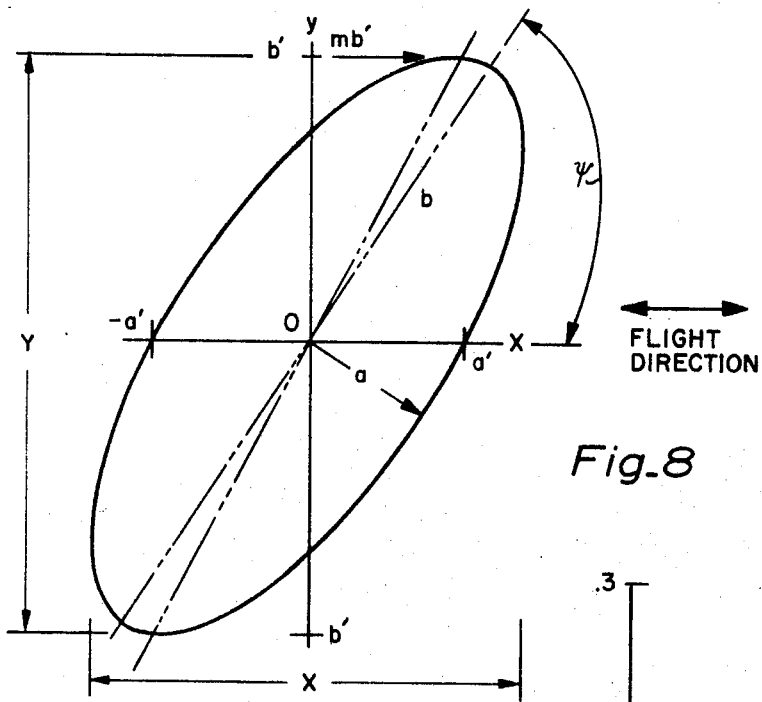
FIG. 8 is a diagram showing the oblique ellipse notation used in the specification.

One of the unspoken assumptions in aircraft design is that of bilateral or mirror symmetry. For slow speed flight this assumption is well founded partly because of the indications derived from aerodynamic theory, but also because it is consistent with the observed evolutionary form of birds. While it may perhaps seem natural to presume that these attributes carry over into the realm of supersonic flight, there has heretofore been no rational discussion of the merits of bilateral symmetry in aircraft designed for supersonic flight. In fact, once the velocity of sound is exceeded, the laws of aerodynamics change in such a way as to make it inadvisable to arrange the components of an aircraft in side-by-side or abreast relationship in a supersonic airstream unless there are compelling reasons for doing so.

Both the well known transonic area rule and the supersonic small disturbance theory show large adverse interference effects for bodies or wings in a mirror-symmetric arrangement. For example, using supersonic wave drag theory, it can be shown that two airplanes flying in close proximity at a slightly supersonic speed cause a doubling of the drag on each due to wave interference with the other, while in a staggered or antisymmetric arrangement, the wave interference is favorable so that the drag of the two airplanes is no greater than that of a single plane in flight. The present invention takes these principles into account in order to provide an aircraft having efficient flight characteristics at both subsonic and supersonic speeds.

Referring now to FIGS. 1-4 of the drawing, a preferred embodiment of the present invention is shown in the form of a dual fuselage, yawable wing transport aircraft 10 depicted in a supersonic configuration. Aircraft 10 includes a pair of elongated fuselages 12 and 14 in combination with a pair of airfoils including a main wing 16 and a horizontal stabilizer 18. Fuselages 12 and 14 may be identical in external configuration or may be independently designed to have the best aerodynamic configurations for a particular speed. For example, it might be desirable to shorten, or otherwise modify the forward configuration of fuselage 14 in order to achieve favorable wave interference characteristics between the two fuselages at a particular speed. In any case, the outer hulls of both fuselages 12 and 14 are of generally conventional supersonic design and have vertical stabilizers 20 and 22 affixed to the aft ends thereof.

Wing 16 is preferably a high aspect ratio airfoil of conventional planform and is pivotally attached to fuselages 12 and 14 at points 24 and 26, respectively, and pivotable between a low speed configuration where its long axis is at 90° relative to fuselages 12 and 14, as shown in FIG. 2, and high speed configurations where its long axis is at angles of less than 90° relative to the fuselages, as shown in FIGS. 3 and 4. The spacing between points 24 and 26 is preferably about one third of the span of wing 16. As discussed in more detail below, wing 16 has a specified upward curvature from its center toward each tip which automatically compensates for change in rolling moment trim as the yaw angle is varied. The curvature also serves to maintain a favorable distribution of lift along the wing as the yaw angle is varied.

Stabilizer 18 is of conventional design and is attached to the aft ends of fuselages 12 and 14 in a suitable manner, as for example, to the tops of vertical stabilizers 20 and 22 at the points 28 and 30, respectively.

Although the number, type and fuselage location of the power plants for aircraft 10 will be determined primarily by factors such as intended area of use of the aircraft, design characteristics, etc., the illustrated preferred embodiment includes four conventional jet turbine engines 32-38 which are respectively mounted to each side of the aft ends of fuselages 12 and 14. The engines are stagger-positioned along the fuselages for reasons which will be discussed below. Alternatively, the engines could, of course, be pivotally affixed to wing 16, but obviously at the cost of increased mechanical complexity.

The manner in which wings 16 and stabilizer 18 are attached to fuselages 12 and 14 is of any suitable design which permits the respective airfoils to be skewed or yawed relative to the two fuselages into a selected yaw configuration. It will, of course, be understood that such mechanism must be capable of withstanding the various loads imparted between the various bodies, while at the same time permitting a substantial degree of freedom of relative rotational movement. A simplified pivoting mechanism for allowing substantially frictionless rotational motion between wing 16 and fuselage 12 (or 14) is shown in FIG. 5 and includes a bearing plate 40 affixed to the super-structure 42 of body 12. Plate 40 is provided with bearing races 42 and 44 on the upper and lower surfaces thereof for receiving suitable bearings 45 and 46, respectively. A matching bearing plate 48 is secured to the super-structure of wing 16 at the lower surface thereof. Plate 48 also includes a race 49 for receiving bearings 45.

A cylindrical shaft 50 is rigidly affixed to wing 16 and bearing plate 48 and extends through an opening 52 in bearing plate 40 where it is coupled and key locked to a gear 54. Shaft 50 has an inside diameter large enough to provide a passageway through which the required electrical and/or hydraulic control connections 70 can be passed. The upper surface of gear 54 is also provided with a bearing race 58 for receiving bearings 46. Note that gear 54, when locked to shaft 50 prevents the shaft from moving axially through opening 52. Gear 54 is driven by a drive gear 64 which is in turn driven by a motor 66. The teeth 68 on gear 54 need not extend around the entire circumference thereof, but only around an arcuate section corresponding to the maximum yaw angle for wing 16.

Although it would conceivably be possible to pivotally drive only the main wing 16, with horizontal stabilizer pivots 28 and 30 being passive pivoted connections, it is preferable that all four pivots be positively driven so that positive positioning and locking can be achieved at all four points to provide a rigid structure at any angle of yaw.

In FIG. 6, the drag $C_D$ on two wing panels 100 and 102 disposed in the yawed, straight wing configuration is compared to the drag imposed on similar wing panels 100' and 102' disposed in the swept-back configuration. The swept-back "arrow" configuration formed by panels 100' and 102', which seems intuitively correct for supersonic speed, nevertheless, has a predicted wave drag considerably larger than that for the antisymmetric yawed arrangement formed by panels 100 and 102.

Elements of lift, or volume show favorable wave interference if they are disposed along lines whose normal component velocity is subsonic. Thus, the wave drag of a narrow wing tends toward zero, if the wing is swept behind the Mach cone. For example, see Jones, R.T., "Wing Planforms for High Speed Flight," TN 1033, 1946, NACA, Rep. 863, 1947, NACA. The wave drag reversibility theorems however, indicate that a distribution of lift or volume having a minimum drag should show the same aspect for two opposite directions of flight, i.e., would have fore and aft symmetry. Consideration of the vortex drag indicates further that the projected lift distribution should have lateral symmetry, e.g., eiliptical span loading.

It is interesting that supersonic theory favors symmetry in both longitudinal and lateral distributions of volume or lift, but evidently not mirror symmetry. Intuitively, one would expect that the flight direction of an aircraft should be reflected in its shape i.e., it should somehow point in the direction towards which it is intended to go. However, in view of the reversibility of the wave drag, current computer programs give the same value of the drag with the direction of flight reversed. The reversibility theorems are, of course, limited to the pressure drag and the lift curve slope as determined by linear theory. Thus, the effect of viscosity demands locally different shapes for leading and trailing edges, which are not reversible in practice.

In order to obtain a configuration having a minimum wave drag, the total lift and volume as well as the plane area in which the dimensions of the aircraft are to be limited must be given. It can be seen that for any area abutted by two stream lines 106 and 108 (see FIG. 7) and two characteristic lines 110 and 112, the distribution of lift and volume yielding the minimum pressure drag (i.e., wave drag plus vortex drag) places all the elements of lift and volume near a diagonal "lifting line 114." Such a diagonal line may be considered the limiting configuration of the narrow elliptical wing 120 shown in FIG. 7.

Minimum drag occurs when the surface loading of the ellipse is uniform and when the thickness is distributed so that the projected cross sectional areas (taken along lines parallel to the flight direction indicated by the arrow V) are those of a Sears-Haack body. (See Jones, R.T., "Possibilities of Efficient High Speed Transport Airplanes," *Proceedings Of Conference on High Speed Aeronautics*, Polytechnic Institute of Brooklyn, Jan. 20-22, 1955; Edward Bros. 1; and Smith, J.H.B., "Lift/Drag Ratios of Optimized Slewed Elliptical Wings at Supersonic Speeds," *The Aeronautical Quarterly*, Royal Aeronautical Society, Volume XII, September 1961.) This result is of interest not so much as an exact prescription of shape, but because it indicates that lift and volume can be concentrated within a narrow dimension having a small wetted area, and hence small friction drag, provided the "lifting line" extends in a subsonic direction. Linear theory shows an infinite drag if the lifting line becomes supersonic.

The favorable properties of the yawed wing depend first of all on the maintenance of a subsonic type of section flow at supersonic speeds, and this requires that the long axis of the wing be placed at an angle of yaw relative to the longitudinal axis of the fuselage such that the Mach number (M) of a component normal to its long axis is subsonic. If it is assumed that the critical "drag divergence" Mach number of the wings section is 0.7, then the angle of yaw must be such as to reduce the Mach number of the normal component to this value. At $M = 1.0$, the angle of yaw required is 45°.

Another advantage of the yawed wing over the swept wing relates to the increased extension of the wing in the flight direction. As is well known, spreading the lift over a greater length in the direction of flight diminishes both the sonic boom intensity and the drag. For a given structural slenderness, the single yawed wing panel may have nearly twice the projected length (along the flight direction) of the corresponding swept wing. Note that in the illustrated preferred embodiment not only is the wing spread over a greater than usual length in the flight direction, but so are the fuselages and engines in order to obtain reduced drag and lower sonic boom intensity. These statements may be supported by linear drag theory where drag is expressed as:

$$(1) \quad \text{Drag} = C_{D_0} q S_w + \frac{L^2}{\pi q Y^2} + \frac{M^2 - 1}{2\pi q} \frac{L^2}{\overline{X}_1^2} + \frac{128 q}{\pi} \frac{\text{Vol.}^2}{\overline{X}_2^4}$$

where $C_{D_0}$ is the viscous of friction drag coefficient;

$q$ is the dynamic pressure $\rho V^2/2$, where $\rho$ is air density and $V$ is velocity;

$S_w$ is the wing area;

$Y$ is the wing span as shown in FIG. 7;

$\overline{X}_1$ and $\overline{X}_2$ are the average lengths $X(\theta)$ of the wing as projected by characteristic planes (Mach planes) set at different angles $\theta$ around the $X$ axis. The lengths $\overline{X}_1$ and $\overline{X}_2$ are defined by the expressions $$(2) \quad \frac{1}{\overline{X}_1^2} = \frac{1}{\pi} \int_0^{2\pi} \frac{\sin^2 \theta}{X(\theta)^2} \, d\theta$$

$$(3) \quad \frac{1}{\overline{X}_2^4} = \frac{1}{2\pi} \int_0^{2\pi} \frac{d\theta}{X(\theta)^4}$$

In equation (1), the distributions of lift and volume assumed are those giving the smallest drag consistent with the geometric constraints $X$ and $Y$. At low supersonic Mach numbers and large angles of sweep or yaw, the lengths $\overline{X}_1$ and $\overline{X}_2$ are close to the actual X-wise extension, or length of the wing. Hence, the wave drag due to the lift diminishes approximately as the inverse square of the length, while the wave drag due to volume goes down with the inverse fourth power.

The second term of equation (1) is the well known linear formula for the induced drag of a wing having an elliptic span-load distribution. Here one tires to maximize the span $Y$ and to minimize the wetted area ($2S_w$) by reducing the width of the wing in the flight direction. According to the linear theory (induced drag theory), the drag of the wing at subsonic speeds is independent of either the extension of the distribution of lift in the flight direction. Hence, the long, narrow, straight wing, or "lifting line," is ideal at subsonic speeds since it minimizes the wetted area. The success of the rule for increasing the lift-to-drag ratio $L/D$, by increasing the aspect ratio depends however, on the maintenance of Kutta-Joukowsky flow. It one tries to approach the "lifting line" too closely the lifting pressure becomes excessive and non-linear effects associated with flow separation or shock losses will intervene. In spite of these lifting phenomena, sailplanes with extreme proportions have achieved $L/D$ ratios as high as 40 or 50:1.

At supersonic speeds the appearance of the wave drag (third and fourth terms of equation 2) requires that the wing have as great a length as possible, as well as a wide span and small surface area. The rules determining the optimum wing form are then similar to those determining the wing form for a sailplane, except that at supersonic speeds one tries to maximize the span and the length in the flight direction while still having a minimum surface area. Again, if one tries to approach the idealized lifting line too closely, nonlinear phenomena will intervene. Also, the lifting pressure may exceed the maximum lift coefficient of the sections, or if the crosswise component Mach number is too high, super-critical shock losses will appear.

For the wing of elliptic planform as illustrated generally in FIG. 8, the pressure drag associated with the lift (wave drag and vortex drag) is a minimum when the lift is distributed uniformly over the surface. The formula given by linear theory in this case is, 4. $\Delta C_D = C_L^2/4 \; R.P. \; \sqrt{\beta^2 - [m + i \, (a'/b')]^2}$ where 5. $\beta^2 = M^2 - 1$ 6. $m = [(b^2 - a^2) \sin \psi \cos \psi / b'^2]$ 7. $b' = \sqrt{a^2 \cos^2 \psi - b^2 \sin^2 \psi}$ 8. $a'b' = ab$ where $C_L$ is the lift coefficient, i.e., $L/qs$, where $L$ is the lift and $s$ is the wings planform area;

$R.P.$ is the "real part of" the radical solution;

$M$ is the Mach number;

$m$ is defined by (6);

$a$ and $b$ are the major and minor semi-axes of the ellipse and $\psi$ is the complement of the angle of yaw as shown in FIG. 8.

Figure 9:
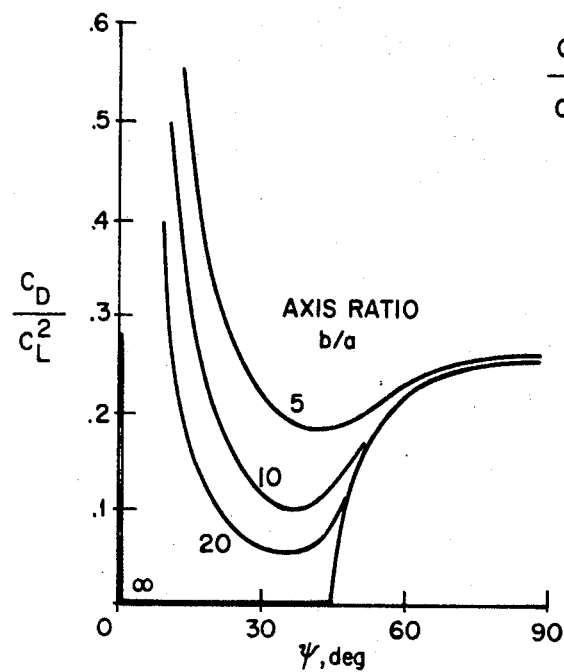
FIG. 9 is a diagram illustrating drag due to lift as a function of yaw angle for oblique elliptic wings at $M = 1.4$.

FIG. 9 shows the variation of the drag due to lift with angle of yaw for ellipses of various proportions at a Mach number of 1.41.

Figure 10:
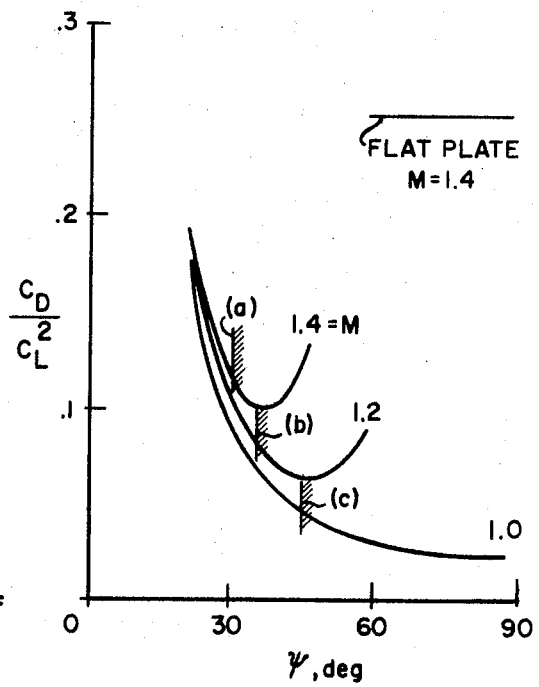
FIG. 10 is a diagram illustrating drag due to lift for oblique elliptic wings where $b/a = 10$.

FIG. 10 is similar, but shown the effect of Mach number for an elliptic wing with an axis ratio of 10:1. At $M = 1.0$ the value shown is simply the induced drag or vortex drag which is, of course, large at large angles of yaw because of the small span. ALso shown in FIG. 10 at (a), (b) and (c) respectively, are the angles of yaw at which the crosswise Mach number exceeds an assumed critical value of 0.7. The minimum wave drag for a given internal volume of the elliptic wing occurs when the thickness ratio of the section falls off elliptically toward the tip. (See Jones, R.T., "Theoretical Determination of the Minimum Drag of Airfoils at Supersonic Speeds," *Journal of the Aeronautical Sciences*, Volume 19, No. 12, December 1952.)

Figure 11:
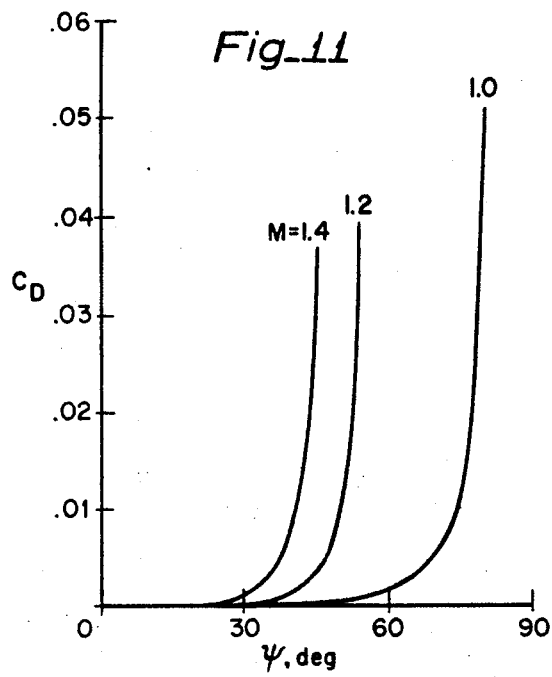
FIG. 11 is a diagram illustrating drag due to volume for oblique elliptic wings where $t/2a = 0.1$ and $b/a = 10$.

The formula for the drag due to the thickness of volume in the case of the yawed ellipse is given in the above mentioned Smith reference, and the results are plotted in FIG. 11 for an axis ratio of 10:1 and a root thickness/chord ratio of 0:1.

The wave drag associated with the volume of the wing shows a steep rise as the long axis of the wing turns into the direction of flight, the influence of the inverse fourth power of the projected length. Here, however, the drag increase associated with nonlinear or supercritical flow over the wing section may dominate so that the predication of linear theory will not be adequate. It is here that the newer developments in supercritical wing sections exemplified by the work or Piercey, Niewland and Whitcomb may be significant for the anti-symmetric wing.

Figure 12:
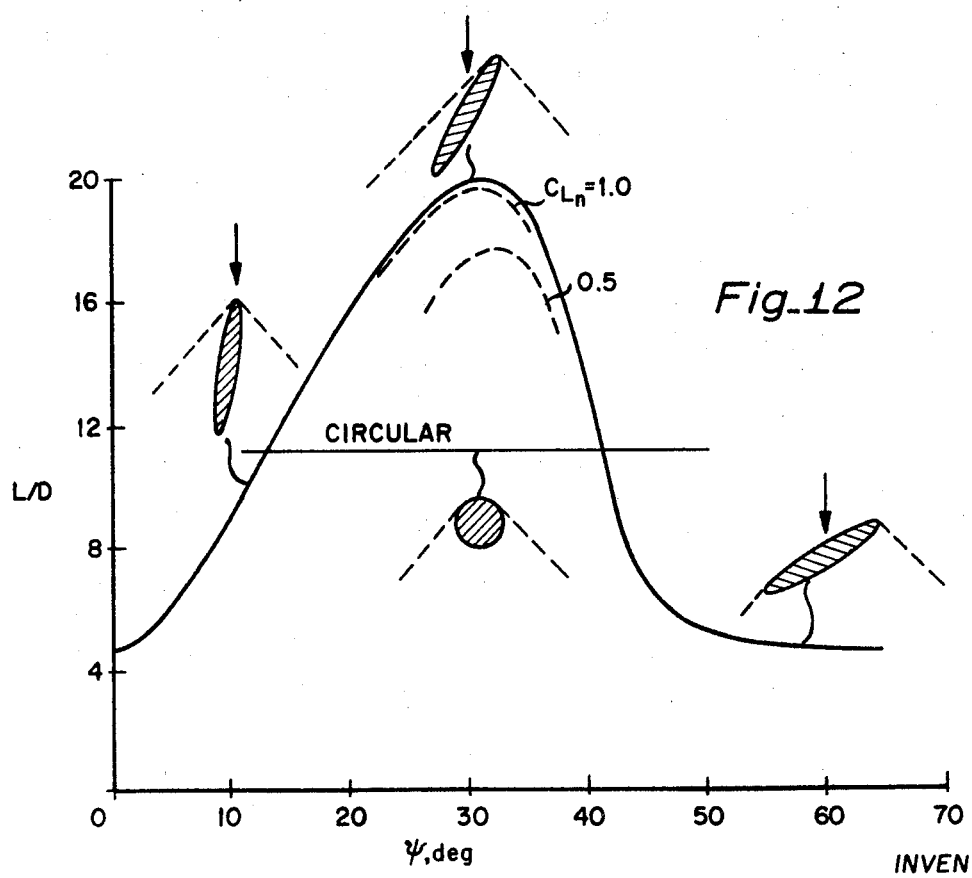
FIG. 12 is a diagram illustrating estimated lift/drag ratios for oblique elliptic wings at $M = 1.4$ where $b/a = 10 (t/2a) = 1/10$.

The drag values given by linear theory together with a suitable estimate of the skin friction enable the prediction to be made of lift/drag ratios of elliptic wings at various Mach numbers and yaw angles. Such predictions will be valid if proper account is taken of the limitations imposed by nonlinear phenomena. FIG. 12 illustrates predictions for an ellipse of 10:1 axis ratio, 10 percent thickness, and a friction drag coefficient of 0.005. The dotted curves show the effect of limiting the section lift coefficient to values of 1.0 and 0.5 respectively. Support for these curves may be found in Jones, R. T., "Aerodynamic Design for Supersonic Speeds," *Proceedings of the First International Congress in the Aeronautical Sciences*, Madrid, September 1958, and *Advances in Aeronautical Science*, Pergamon Press, 1959.

Figure 13:
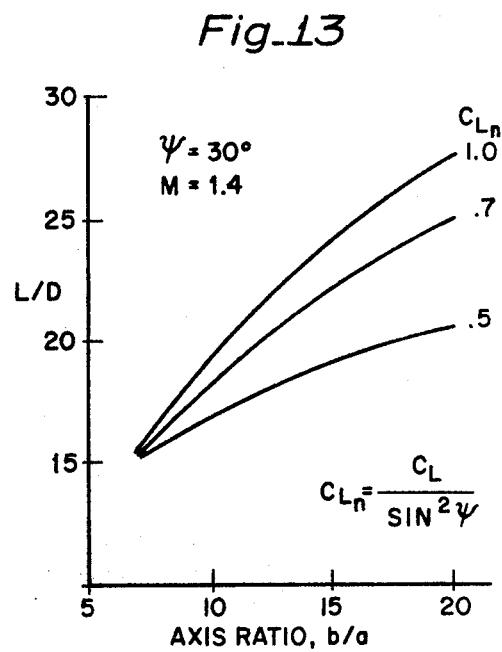
FIG. 13 is a diagram illustrating the variation of L/D with axis ratio and showing the effect of limitation of the normal lift coefficient $C_{I_n}$.

FIG. 13 shows how the increase of $L/D$ with aspect ratio depends on the possibility of achieving rather high lift coefficients.

Lift/drag values for yawed elliptic wings at $M = 2.0$ have been calculated in the above mentioned Smith reference. FIG. 14 shows results of this calculation. At $M = 2.0$ peak lift drag ratios occur at $\psi = 15°$ to $20°$ corresponding to sweep angles $70°-75°$. The optimum crosswise Mach number indicated by linear theory is approximately 0.7, close to one limit imposed by nonlinear effects.

In FIG. 15 the drag $C_D$ for yawed and swept wing bodies having sweep angles of 40° (yaw angle of 50°) are plotted as a function of Mach number, to show the drag at zero lift. As indicated, at $M = 1.0$ the anti-symmetric or yawed configuration has much smaller drag than does the symmetric configuration. However, at $M = 1.15$, the normal component of $M$ is approximately 0.88, exceeding the drag rise Mach number of the sections. Beyond this point, the drag of the yawed wing is higher.

When the advantages of subsonic sweep first became evident, questions were raised about the possibility of flying an airplane with the wings set at a large angle of yaw. During the early experiments, (see Campbell, J.P. and Drake, H.M., "Investigation of Stability and Control Characteristics of an Airplane Model with Skewed Wing in the Langley Free-Flight Tunnel ," TN 1208, 1947, NACA), it was found that the yawed wing avoided the large rolling moment due to slideslip and the consequent short period rolling oscillations of the swept wing. It was also noted that the flight characteristics of the model remained essentially unchanged up to angles of yaw of 40° and were still satisfactory at 50°. Of special interest was the observation that deflection of the ailerons produced no observable pitching motion in free flight. Evidently, the change in longitudinal lift distribution produced by deflecting the ailerons is almost immediately cancelled by rolling motion. The wing, in effect, simply follows the helix angle defined by an effective twist associated with the aileron deflection with no significant changes in lift distribution. The longitudinal stability and the trimmed lift are then governed by the position of the aerodynamic center and the horizontal tail setting referred to the oblique axis of the wing.

While satisfactory stability can be achieved with the yawed wing in the normal flight range, some unusual effects will certainly be apparent. One effect that can be anticipated is a coupling between yaw angle and vertical acceleration, i.e., $\delta L/\delta \psi$. A simple estimate for a wing at a 45° yaw can be shown by the expression 9. $(1/L) (\delta L/\delta \psi) = 1$ i.e., 1g per radian of slideslip angle $\psi$. This value may be compared to the sensitivity of vertical acceleration to angle of attack $(\alpha)$ changes. Assuming $\delta C_L/\delta \alpha = 5$, and a flight lift coefficient of 1.0, the appropriate expression is 10. $(1/L) (\delta L/\delta \alpha) = 5$ Hence, the sensitivity to yaw is about 1/5 the sensitivity to pitch.

Dynamic coupling between different degrees of freedom is not always undesirable since excessive damping in one mode may be distributed to a mode that would otherwise be deficient. Of course conventional treatments of stability, which assume bilateral symmetry with the resulting division into longitudinal and lateral motions, are inapplicable in this case, and a full treatment involving 6° of freedom as well as aeroelastic deformations will be required.

One of the problems encountered in utilizing a yawed wing have a flat chord plane is that a high angles of yaw, non-uniform lifting pressure will be developed along the axis thereby imparting a roll moment to the aircraft. FIG. 16 shows the calculated span-wise distribution of lift for a flat elliptic wing at various yaw angles and Mach numbers. From these curves, it can be seen that the centroid of lift is shifted toward the trailing tip thereby producing a roll moment which would tend to cause the aircraft to roll to the right. Note also that since the lift is greater aft to the points at which the wing is affixed to the fuselage(s) there will also be a tendency to produce a nose-down pitching moment.

Curve 210 of FIG. 17 shows the variation in angle of attack $\alpha$ that is needed along the span of elliptic wing 16 to equalize the lifting pressure when the wing is yawed at an angle of 45° and is flown at a speed of Mach 1. This curve indicates that the angle of attack of the forward tip must be increased and that of the trailing tip must be decreased.

In order to vary the angle of attack along the length of wing 16 so as to eliminate the undesirable roll and pitch moments, the chord plane of wing 16, again shown in planform in FIG. 18 is bowed upwardly as indicated by the long axis section (taken along the lines 19—19) shown in FIG. 18. The effect of curving the ends of wing 16 upwardly is schematically illustrated in FIG. 18 by the projected angular front view shown in the upper left hand portion. Note that the forward portion of the wing presents its underside to the airstream at a greater angle while the trailing portion of the wing presents its underside to the airstream at a lesser angle than does a flat chord wing. Thus, the angle of attack of the leading tip is increased while the angle of attack of the trailing tip is decreased. This obviously modifies the lift characteristics of the yawed wing since, as illustrated in FIG. 19, the end-wise component $V_e$ of the relative wing velocity vector $V$ is directed against the underside of the leading tip and against the upper side of the trailing tip of wing 16.

The upward curvature of the wing may be represented mathematically by the function 11. $Z = f(y)$ where $Z$ is the height of the chord surface above the $XY$ plane, and $y$ is measured in the direction of the long axis of the wing. $\delta Z/\delta y$ then represents the upward slope of the chord surface at any point along the long axis. The curvature of the chord surface is assumed to be cylindrical with generators of the cylindrical shape (not necessarily a circular cylinder) lying parallel to the short axis of the wing.

The change of the local angle of attack $\alpha$, in terms of the yaw angle $\psi$ and the slope $\delta Z/\delta y$, may be expressed as 12. $\delta\alpha \cong \sin\psi \delta Z/\delta y$ to a sufficient approximation.

As is well known, yawed or swept wings tend to stall first at the downstream tips. With the swept wing, the loss of lift at the tips leads to a nose-up tendency aggrevating the stall. In the case of the yawed wing, the situation would seem worse since the asymmetric stall would lead to bank. Special measures used to control the pitch-up tendency of swept wings may quite possibly not be adequate for a yawed wing of high aspect ratio. At best, it is difficult to envision regular landings with the wing in the yawed position and it is therefore appropriate that means be provided for straightening the wing out for landing and takeoff as indicated in the preferred embodiment.

Varying the angle of yaw has, of course, marked advantages for other flight conditions such as "holding" at subsonic speeds, or adapting the airplane to cruise efficiently at different Mach numbers since overland flights of the supersonic aircraft will probably be limited to Mach numbers low enough to avoid a supersonic boom. The aircraft may, however, fly much faster over water.

In operation, with aircraft 10 on the ground, wing 16 and horizontal stabilizer 18 are in the take-off (and landing) configuration illustrated in FIG. 2 of the drawing. In this configuratiothe aircraft is highly stable at low speeds (stall speed is approximately 100 mph) and wing 16 provides adequate lift at relatively low angles of attack (approximately 10° at take-off). Accordingly, the power required from engines 32-38 is substantially less than that required for a prior art supersonic aircraft of equivalent weight which, being designed for supersonic flight, has lifting surfaces providing relatively low lift at low speed and thus must utilize substantially greater power and higher angles of attack in order to achieve the necessary lift required at the low take-off and landing speeds.

As aircraft 10 approaches supersonic flight, wing 16 and horizontal stabilizer 18 are yawed relative to the direction of flight moving fuselage 14 aft with respect to fuselage 12 and to a point such that the nose 80 if fuselage 14 is positioned behind the sonic wave cone 82 which is developed by the nose 85 of fuselage 12. In FIG. 3, for example, a Mach 1 configuration having a yaw angle of 45° is illustrated which places nose 80 slightly behind wave cone 82. Note that the length of wing 16 must also be chosen so that its top 90 is also positioned behind wave cone 82.

In FIG. 4, a Mach 1.4 configuration is illustrated wherein wing 16 is yawed at an angle of 60°. Note that fuselage nose 80 and wing tip 90 still remain behind wave cone 82 even though the cone angle has changed.

An analytical comparison of a yawable wing aircraft, designed to cruise at $M = 2.0$ on a trans-Atlantic flight, to a delta wing type aircraft of the same gross weight, will show an approximate savings in fuel of about 15 percent and an increase in pay load of about 100 percent. Even assuming no gain in $L/D$ at $M = 2.0$, the yawed wing is capable of carrying twice the pay load on a trans-Atlantic flight because of its better off-design performance. It is estimated that current supersonic transports may consume as much as 40 percent of the fuel load in subsonic maneuvers. The ability to cruise or hold efficiently at reduced speed would thus be important for the utility of such aircraft. Current delta-wing transports require large amounts of power for take-off, primarily because of large values of weight per unit span. Since the take-off power diminishes approximately as the 3/2 power of the span loading, an extention of the wing span in accordance with the present invention can be very effective in reducing take-off distance and noise.

Although the present invention has been described above with reference to a single preferred embodiment, it is contemplated that many additional embodiments, alternations and modifications will become apparent to those of ordinary skill in the art after having read the above disclosure. Accordingly, it is to be understood that the disclosure is not to be taken as limiting, the appended claims are to be interpreted as covering all alterations and modifications which fall within the true spirit and scope of the invention.

What is claimed is:

1. An aircraft having variable airframe geometry for accomodating efficient flight at both subsonic and supersonic speeds comprising:
   a first elongated fuselage having a first longitudinal axis;
   a second elongated fuselage having a second longitudinal axis disposed parallel to said first longitudinal axis;
   a first elongated airfoil pivotally connected to said first and second fuselages at first and second points respectively, along its length, said first airfoil being selectively rotatable in a plane generally parallel to a plane defined by said first and second longitudinal axes and between first and second angular dispositions relative to said fuselages; and
   a second airfoil pivotally attached to said first and second fuselages.

2. An aircraft as recited in claim 1 wherein the lateral extremities of said first airfoil are curved upwardly from the center thereof so as to obtain a substantially uniform lift distribution along its length when said first airfoil is disposed at a particular angular disposition other than 90° relative to said fuselages.

3. An aircraft as recited in claim 1 wherein said first and second points are spaced apart a distance approximately equal to one third of the length of said first airfoil.

4. An aircraft as recited in claim 1 and further comprising means for rotating said airfoils relative to said fuselages in a manner such that said second fuselage is moved aft with respect to said first fuselage.

5. An aircraft as recited in claim 1 and further comprising at least one power plant affixed to each of said fuselages.

6. An aircraft as recited in claim 1 and further comprising a pair of power plants affixed to the aft ends of each of said fuselages, one of said power plants on each fuselage being positioned forward of the other.

7. An aircraft having variable airframe geometry for accomodating efficient flight at both subsonic and supersonic speeds, comprising:
   a wing having an approximately elliptic planform and operative to develop aerodynamic lift for supporting said aircraft in flight;
   a horizontal stabilizer disposed parallel to said wing for controlling the pitch attitude of said aircraft;

a first elongated fuselage pivotally connected to said wing and pivotally connected to said horizontal stabilizer;

a second elongated fuselage disposed in spaced apart relationship with said first fuselage and pivotally connected to said wing and said horizontal stabilizer; and means for rotating said wing and said horizontal stabilizer relative to said fuselages whereby one of said fuselages is moved aft with respect to the other fuselage.

8. An aircraft as recited in claim 7 wherein the lateral extremities of said wing are curved upwardly to establish a substantially uniform lift distribution along the length of said wing when said wing is disposed at a particular angle relative to said fuselages.

9. An aircraft as recited in claim 8 wherein the separation between the connections of said first and second fuselages to said wing is approximately one third of the length of said wing.

10. An aircraft as recited in claim 9 and further comprising at least one power plant affixed to each of said fuselages.

11. An aircraft as recited in claim 9 and further comprising a pair of power plants affixed to the aft ends of each of said fuselages, one of said power plants on each fuselage being positioned forward of the other.

12. An aircraft having variable airframe geometry for accomodating efficient flight at both subsonic and supersonic speeds, comprising:

a first fuselage;

a second fuselage disposed in parallel spaced apart relationship with said first fuselage;

a first airfoil; and a second airfoil disposed in parallel spaced apart relationship with said first airfoil, said airfoils being pivotally connected to said fuselages to define a parallelogrammic body in which segments of said fuselages form one set of opposite sides of said body, and segments of said airfoils form the other set of opposite sides of said body.

13. An aircraft as recited in claim 12 and further comprising means for pivotally moving said airfoils relative to said fuselages.

14. An aircraft as recited in claim 13 wherein the length of said first airfoil is at least three times the length of the segment thereof forming that side of said parallelogrammic body.

15. An aircraft as recited in claim 12 wherein the chord surface, defined by the chord lines of said first airfoil, is concave upwardly.

16. An aircraft as recited in claim 15 wherein the change in the local angle of attack ($\Delta \alpha$) of said wing, in terms of a selected yaw angle ($\psi$) and the slope ($\delta Z/\delta y$) of said surface at any point on said chord surface lying along the long axis of said airfoil, is defined by the expression $\Delta \delta \cong \sin\psi \, \delta Z/\delta y$, where $Z$ is the ordinate of the point and $y$ is the abscissa of the point referenced to a plane tangent to said chord surface at the center point of said first airfoil.

* * * * *